US012619087B2

(12) United States Patent
Deng et al.

(10) Patent No.: US 12,619,087 B2
(45) Date of Patent: May 5, 2026

(54) METHOD OF MANUFACTURING OPTICAL ELEMENT AND PROJECTION DEVICE

(71) Applicant: HTC Corporation, Taoyuan City (TW)

(72) Inventors: Qing-Long Deng, Taoyuan City (TW); Chih-Ying Chen, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 342 days.

(21) Appl. No.: 18/476,333

(22) Filed: Sep. 28, 2023

(65) Prior Publication Data

US 2024/0118552 A1      Apr. 11, 2024

Related U.S. Application Data

(60) Provisional application No. 63/378,512, filed on Oct. 5, 2022.

(51) Int. Cl.
*G02B 27/09* (2006.01)
*G03B 21/20* (2006.01)

(52) U.S. Cl.
CPC ..... *G02B 27/0944* (2013.01); *G03B 21/2033* (2013.01); *G03B 21/2053* (2013.01)

(58) Field of Classification Search
CPC ............ G02B 27/0944; G02B 27/0174; G02B 27/0927; G02B 5/0252; G03B 21/2033; G03B 21/2053; G03H 1/0808; G03H 1/0486; G03H 1/265; G03H 2001/0439
See application file for complete search history.

(56) References Cited

PUBLICATIONS

The European extended search report of the corresponding European application No. 23201838.2 issued on Feb. 22, 2024.
I. A. Gus'Kov et al., "Design procedure for a holographic display considering the diffraction efficiency of a volume phase hologram", Journal of Optical Technology, vol. 87, No. 11, Nov. 2020 (Nov. 2020), pp. 650-657, XP093128255.
Changwon Jang et al., "Design and fabrication of freeform holographic optical elements", ACM Transactions On Graphics, vol. 39, No. 6, Article 184, Nov. 26, 2020 (Nov. 26, 2020), pp. 1-15, XP059134798.
J. W. Lewis et al., "A generalized coupled wave theory of volume diffraction in two dimensions", Proc. R. Soc. Lond., vol. A398, 1985, pp. 45-80, XP093128434.

*Primary Examiner* — Angela M. Medich
(74) *Attorney, Agent, or Firm* — CKC & Partners Co., LLC

(57) ABSTRACT
A method of manufacturing a holographic element used in a projection device is provided. The projection device has a light source configured to emit light conforming to a non-uniform light intensity distribution function. The method includes: multiplying the non-uniform light intensity distribution function by a diffraction intensity and angle function of a grating to obtain a product function; determining whether the product function is substantially equal to 1 in a predetermined range of angle or wavelength; if the the determination result is yes, determining a pair of incident angles respectively of a reference beam and a signal beam according to the diffraction intensity and angle function; and recording a holographic material with the reference beam and the signal beam respectively at the pair of incident angles, so as to manufacture a holographic element with the grating therein.

11 Claims, 11 Drawing Sheets

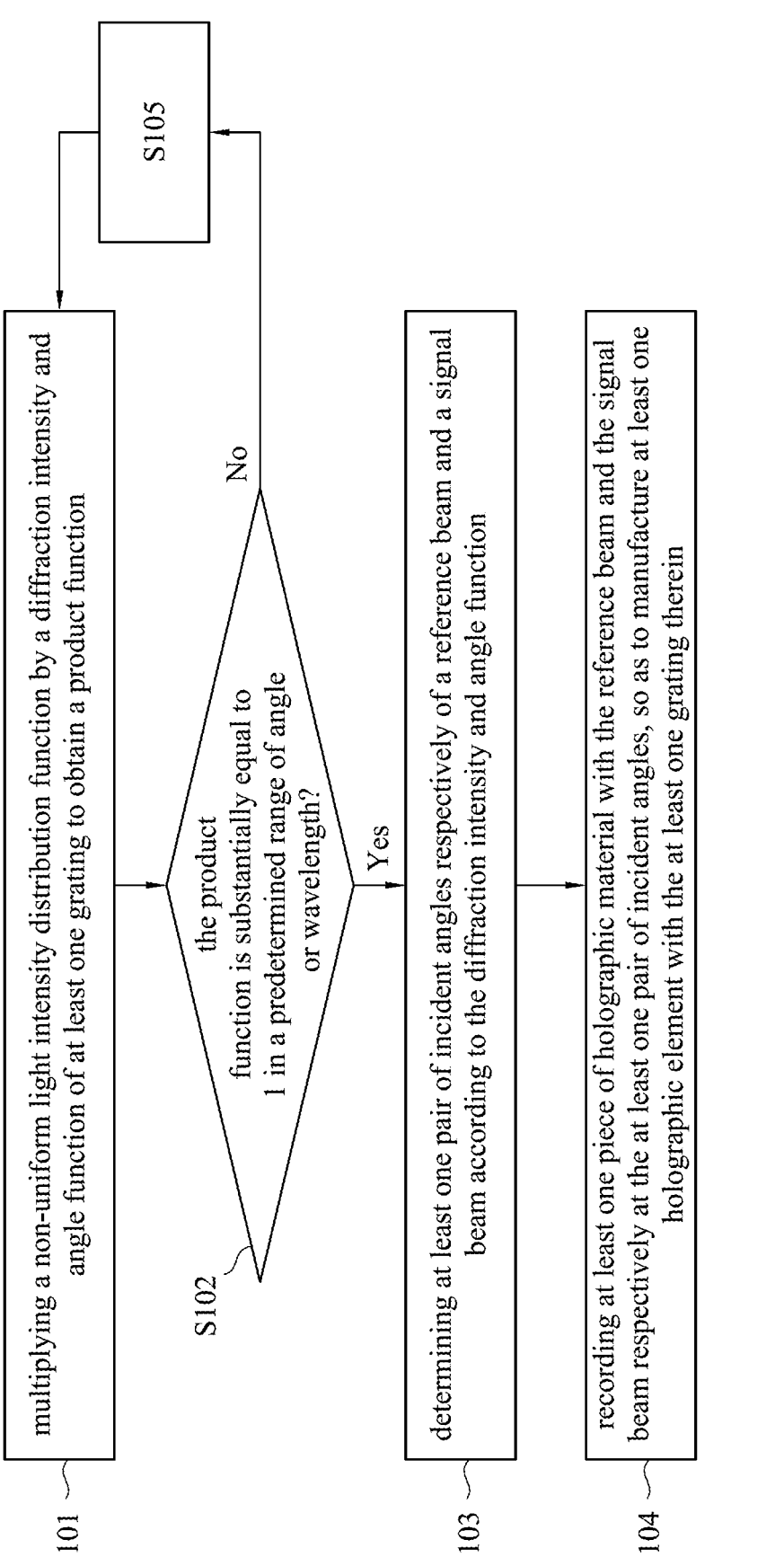

S101 multiplying a non-uniform light intensity distribution function by a diffraction intensity and angle function of at least one grating to obtain a product function S102 the product function is substantially equal to 1 in a predetermined range of angle or wavelength?

No

S105

Yes

S103 determining at least one pair of incident angles respectively of a reference beam and a signal beam according to the diffraction intensity and angle function S104 recording at least one piece of holographic material with the reference beam and the signal beam respectively at the at least one pair of incident angles, so as to manufacture at least one holographic element with the at least one grating therein

METHOD OF MANUFACTURING OPTICAL ELEMENT AND PROJECTION DEVICE

CROSS-REFERENCE TO RELATED APPLICATION

This application claims priority to U.S. Provisional Application Ser. No. 63/378,512, filed on Oct. 5, 2022, which is herein incorporated by reference.

BACKGROUND

Technical Field

The present disclosure relates to a method of manufacturing an optical element and a projection device.

Description of Related Art

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image to a location where a user of a device can view the image as a virtual image in an augmented reality environment. As this is still an emerging technology, there are certain challenges associated with utilizing waveguides to display images of virtual objects to a user.

Nowadays, many conventional waveguides with diffraction gratings attached thereon have been used. Each of the waveguides and the diffraction gratings attached thereon are used for transmitting a single color. As such, a conventional projection device for providing projected images to an eye of a user usually requires a plurality of waveguides to transmit three primary colors, which is not conducive to the reduction of weight and thickness of the projection device. In addition, when transmitting a monochromatic or full-color exit pupil image, the diffraction efficiency at different angles will be caused by different wavelengths and different incident angles, so the problem of uneven image brightness is prone to occur. To this end, additional optical compensation components need to be added to solve the problem, making the overall optical system more complex and increasing in size.

Accordingly, it is an important issue for the industry to provide a method of manufacturing an optical element and a projection device capable of solving the aforementioned problems.

SUMMARY

An aspect of the disclosure is to provide a method of manufacturing an optical element and a projection device that can efficiently solve the aforementioned problems.

According to an embodiment of the disclosure, a method of manufacturing an optical element used in a projection device. The projection device has a light source configured to emit light conforming to a non-uniform light intensity distribution function. The method includes: multiplying the non-uniform light intensity distribution function by a diffraction intensity and angle function of at least one grating to obtain a product function; determining whether the product function is substantially equal to 1 in a predetermined range of angle or wavelength; if the product function is substantially equal to 1 in the predetermined range of angle or wavelength, determining at least one pair of incident angles respectively of a reference beam and a signal beam according to the diffraction intensity and angle function; and recording at least one piece of holographic material with the reference beam and the signal beam respectively at the at least one pair of incident angles, so as to manufacture at least one holographic element with the at least one grating therein.

In an embodiment of the disclosure, the method further includes: obtaining the diffraction intensity and angle function of the at least one grating according to Kogelnik's coupled-wave theory.

In an embodiment of the disclosure, the obtaining the diffraction intensity and angle function uses parameters including a total internal reflection angle, a refractive index modulation of the at least one piece of holographic material, a thickness of the at least one piece of holographic material, at least one grating established wavelength, at least one surface period width, and at least one slant angle of grating.

In an embodiment of the disclosure, the method further includes: adjusting the diffraction intensity and angle function by adjusting at least one of the at least one surface period width and the at least one slant angle of grating if the product function is not substantially equal to 1 in the predetermined range of angle or wavelength.

In an embodiment of the disclosure, the method further includes: iteratively adjusting the diffraction intensity and angle function to approximate the product function to 1 in the predetermined range of angle or wavelength.

In an embodiment of the disclosure, the method further includes: multiplying the non-uniform light intensity distribution function by another diffraction intensity and angle function of another grating to obtain another product function; determining whether the another product function is substantially equal to 1 in another predetermined range of angle or wavelength; if the another product function is substantially equal to 1 in the another predetermined range of angle or wavelength, determining another pair of incident angles the reference beam and the signal beam according to the another diffraction intensity and angle function; and recording the at least one piece of holographic material with the reference beam and the signal beam respectively at the another pair of incident angles, so as to form the another grating in the at least one holographic element.

In an embodiment of the disclosure, the at least one grating and the another grating correspond to an identical range of angle and respectively correspond to different ranges of wavelength.

In an embodiment of the disclosure, the at least one grating and the another grating correspond to an identical range of wavelength and respectively correspond to different ranges of angle.

In an embodiment of the disclosure, the method further includes: obtaining the diffraction intensity and angle function by convolving a plurality of sub-diffraction intensity and angle functions.

In an embodiment of the disclosure, a number of the at least one grating is plural. The gratings respectively conform to the sub-diffraction intensity and angle functions. A pair number of the at least one pair of incident angles is plural. Each of the pairs of incident angles respectively corresponds to the sub-diffraction intensity and angle functions. The recording includes recording the at least one piece of holographic material with the reference beam and the signal beam respectively at each of the pairs of incident angles.

In an embodiment of the disclosure, the method further includes: if the product function is not substantially equal to 1 in the predetermined range of angle or wavelength, adjusting the diffraction intensity and angle function by convolving the sub-diffraction intensity and angle functions with another sub-diffraction intensity and angle function; determining whether the adjusted product function is substantially equal to 1 in a predetermined range of angle or wavelength; if the adjusted product function is substantially equal to 1 in the predetermined range of angle or wavelength, determining a plurality of pairs of incident angles of the reference beam and the signal beam respectively according to the sub-diffraction intensity and angle functions and the another sub-diffraction intensity and angle function; and recording the at least one piece of holographic material with the reference beam and the signal beam respectively at each of the pairs of incident angles, in which a number of the at least one grating is plural, and the gratings respectively correspond to the sub-diffraction intensity and angle functions and the another sub-diffraction intensity and angle function.

In an embodiment of the disclosure, a number of the at least one piece of holographic material, a number of the at least one holographic element, and a number of the at least one grating are plural. The recording respectively forms two of the gratings in two of the holographic elements.

According to an embodiment of the disclosure, a projection device includes a light source and at least one holographic element. The light source is configured to emit light conforming to a non-uniform light intensity distribution function. The holographic element includes at least one grating therein. A product function of the non-uniform light intensity distribution function and a diffraction intensity and angle function of the at least one grating is substantially equal to 1 in a predetermined range of angle or wavelength, so that the light after directly arriving and passing through the at least one holographic element conforms to a uniform light intensity distribution function.

In an embodiment of the disclosure, a number of the at least one grating is plural. The gratings respectively conform to a plurality of sub-diffraction intensity and angle functions. The diffraction intensity and angle function is a convolution of the sub-diffraction intensity and angle functions.

In an embodiment of the disclosure, the gratings correspond to an identical range of angle and respectively correspond to different ranges of wavelength.

In an embodiment of the disclosure, the gratings correspond to an identical range of wavelength and respectively correspond to different ranges of angle.

In an embodiment of the disclosure, a number of the at least one holographic element and a number of at least one grating are plural. Two of the gratings are respectively comprised in two of the holographic elements.

Accordingly, in the method of manufacturing an optical element and the projection device, the at least one grating formed in the at least one holographic element can compensate the light emitted by the light source which conforms to the non-uniform light intensity distribution function, so that the compensated light can conform to the uniform light intensity distribution function and thus a uniform image can be obtained. In this way, there is no need to add components for uniform light in the projection device, and the number of multiplexing of the holographic gratings can be reduced to make the projection device more efficient and lighter.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 5 is a flow chart of a method of manufacturing an optical element according to some embodiments of the present disclosure;

DETAILED DESCRIPTION

Figure 1:
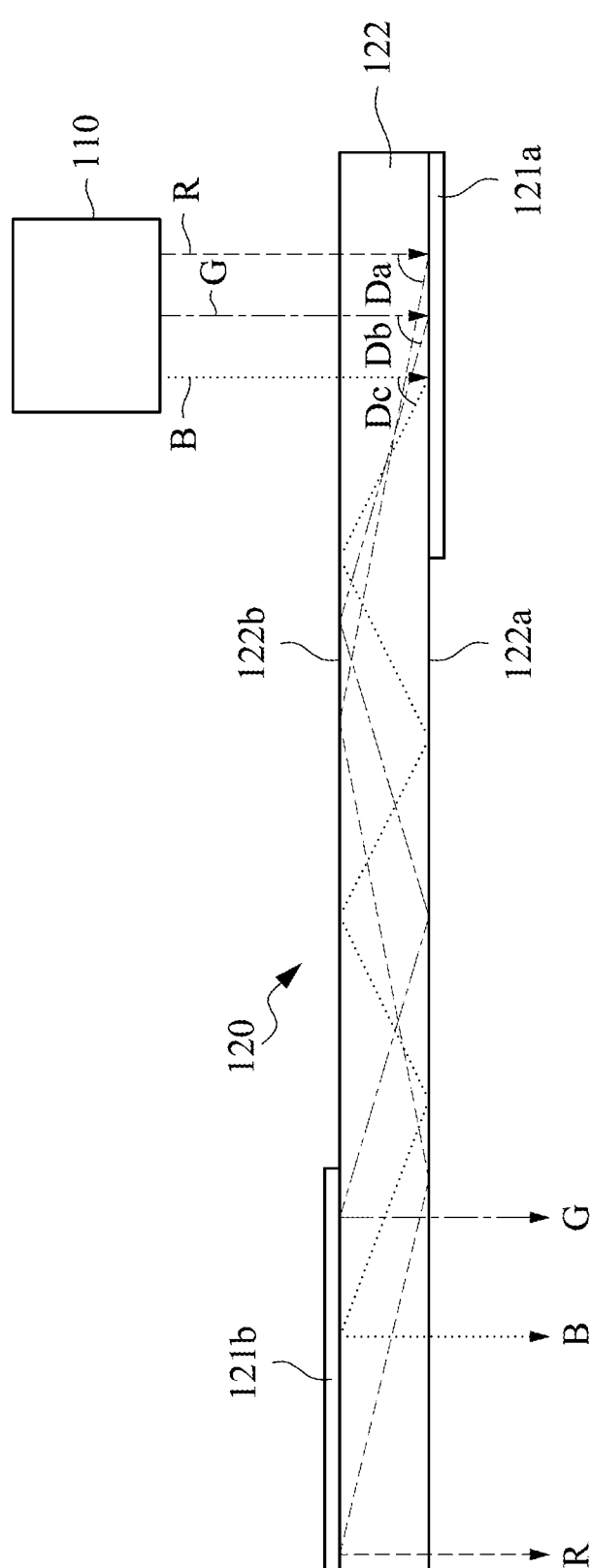
FIG. 1 is a schematic diagram of a projection device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of a projection device 100 according to some embodiments of the present disclosure. As shown in FIG. 1, the projection device 100 may be used in an augmented reality device (not shown) which can be implemented as head-mounted display (HMD) glasses or other wearable display devices, but is not limited thereto. The projection device 100 includes a light source 110 and a waveguide device 120. The waveguide device 120 includes two holographic elements 121a, 121b and a waveguide element 122. The holographic elements 121a, 121b are attached to the waveguide element 122 and serve as light guiding elements of light-input and light-output, respectively. That is, light projected by the light source 110 can be inputted to the holographic element 121a and outputted from the holographic element 121b, and the waveguide element 122 is configured to guide the light propagated from the holographic element 121a to the holographic element 121b based on the principle of total internal reflection.

In some embodiments, the light source 110 is configured to project red light R, green light G, and blue light B, but the disclosure is not limited in this regard. In some embodiments, the wavelength band of the red light R projected by the light source 110 is from about 622 nm to about 642 nm, but the disclosure is not limited in this regard. In some embodiments, the wavelength band of the green light G projected by the light source 110 is from about 522 nm to about 542 nm, but the disclosure is not limited in this regard. In some embodiments, the wavelength band of the blue light B projected by the light source 110 is from about 455 nm to about 475 nm, but the disclosure is not limited in this regard. In some embodiments, the light source 110 adopts light-emitting diodes to project the red light R, the green light G, and the blue light B. In practical applications, the light source 110 may adopt laser diodes to project the red light R, the green light G, and the blue light B with smaller wavelength band.

Figure 2:
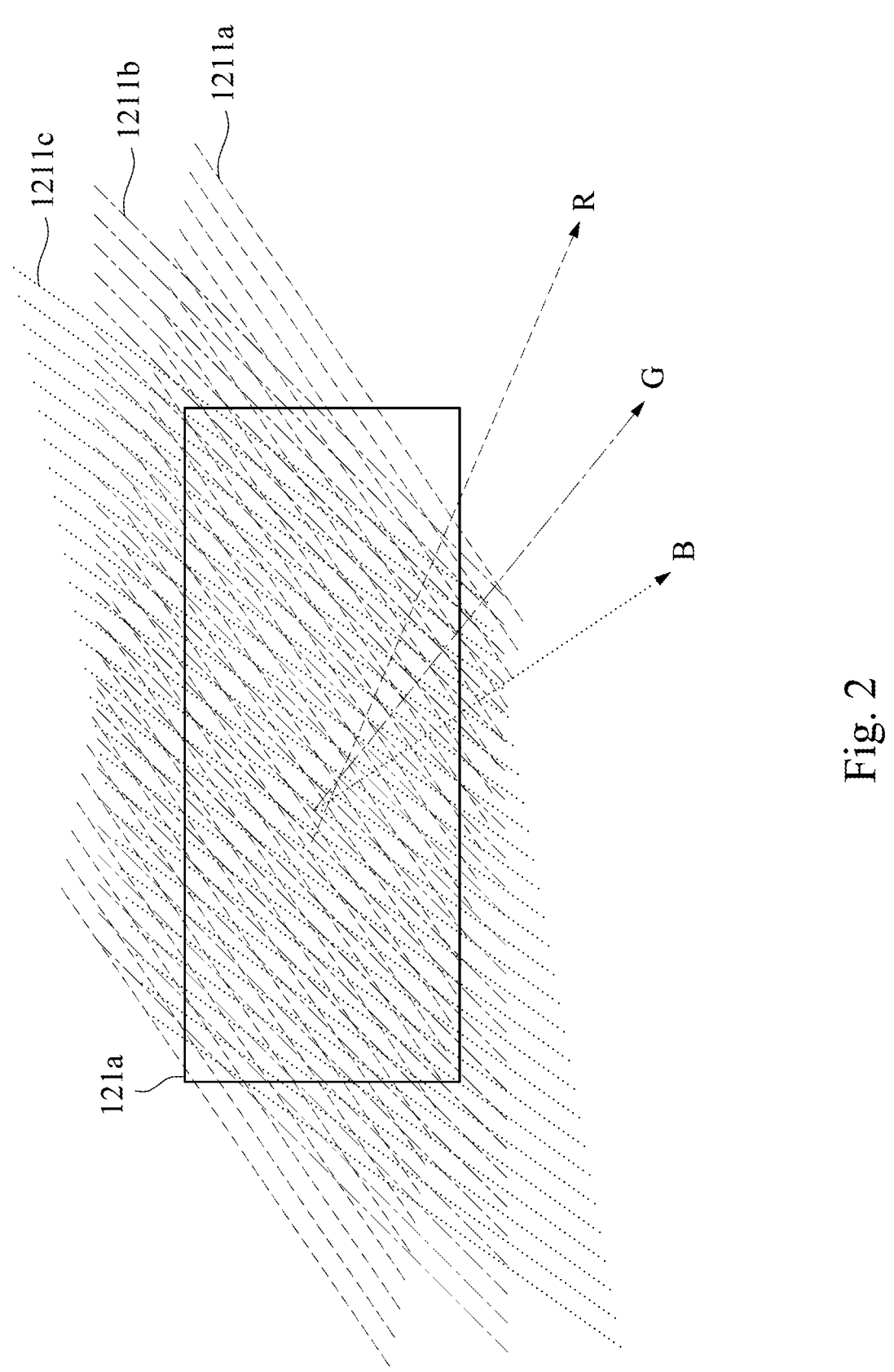
FIG. 2 is a schematic diagram illustrating a holographic element according to some embodiments of the present disclosure.

Reference is made to FIG. 2. FIG. 2 is a schematic diagram illustrating the holographic element 121a according to some embodiments of the present disclosure. For example, FIG. 2 shows a surface of the holographic element 121a attached to the waveguide element 122 as shown in FIG. 1, and the viewing angle of FIG. 2 is perpendicular to the surface of the holographic element 121a. As shown in FIGS. 1 and 2, the holographic element 121a has a first holographic grating 1211a, a second holographic grating 1211b, and a third holographic grating 1211c. The first holographic grating 1211a is configured to diffract the red light R projected by the light source 110 to propagate with a first range of diffraction angle. For example, the first holographic grating 1211a is configured to diffract light of which the wavelength is 632 nm (which is within the wavelength band of the red light R) to propagate with a first diffraction angle Da. The second holographic grating 1211b is configured to diffract the green light G projected by the light source 110 to propagate with a second range of diffraction angle. For example, the second holographic grating 1211b is configured to diffract light of which the wavelength is 532 nm (which is within the wavelength band of the green light G) to propagate with a second diffraction angle Db. The third holographic grating 1211c is configured to diffract the green light B projected by the light source 110 to propagate with a third range of diffraction angle. For example, the third holographic grating 1211c is configured to diffract light of which the wavelength is 465 nm (which is within the wavelength band of the blue light B) to propagate with a first diffraction angle Dc. The waveguide element 122 is configured to guide the red light R, the green light G, and the blue light B propagated from the holographic element 121a to the holographic element 121b.

In some embodiments, the first holographic grating 1211a, the second holographic grating 1211b, and the third holographic grating 1211c are superimposed together. In other words, the first holographic grating 1211a, the second holographic grating 1211b, and the third holographic grating 1211c pass through each other. As such, the holographic element 121a can have a small size.

In some embodiments, the first holographic grating 1211a, the second holographic grating 1211b, and the third holographic grating 1211c are volume holographic gratings. It is notable that light diffracted by a volume holographic grating can propagate with a specific diffraction angle based on the Bragg's law.

In some embodiments, the holographic element 121b may also be formed with the first holographic grating 1211a, the second holographic grating 1211b, and the third holographic grating 1211c. As such, portions of the red light R, the green light G, and the blue light B propagating in the waveguide element 122 can be respectively diffracted by the first holographic grating 1211a, the second holographic grating 1211b, and the third holographic grating 1211c of the holographic element 121b and then be outputted out of the waveguide device 120 to reach an eye of a user.

Figure 3:
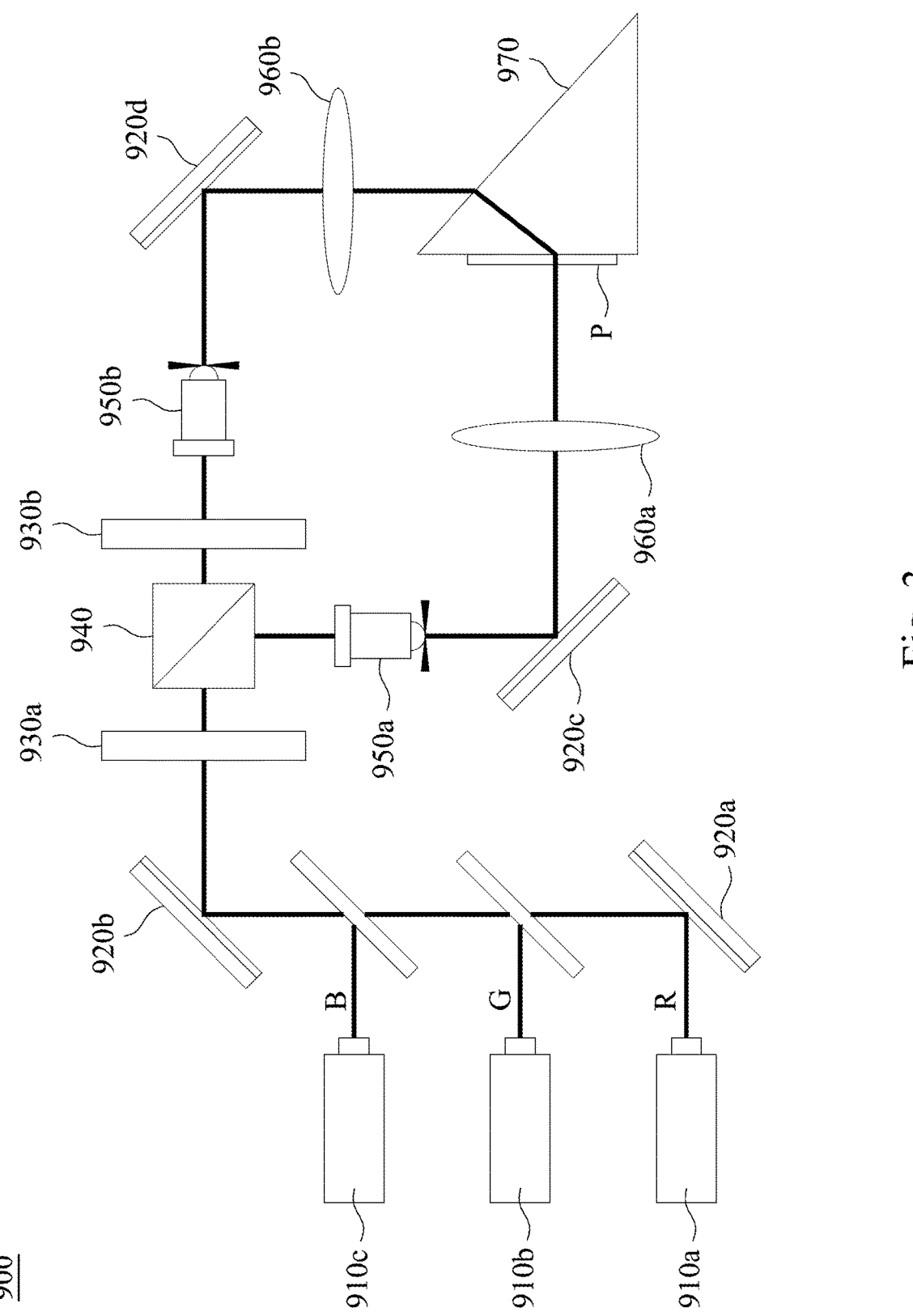
FIG. 3 is a schematic diagram of an optical exposure system according to some embodiments of the present disclosure.

Reference is made to FIG. 3. FIG. 3 is a schematic diagram of an optical exposure system 900 according to some embodiments of the present disclosure. As shown in FIG. 3, the optical exposure system 900 includes three light sources 910a, 910b, 910c configured to emit the red light R, the green light G, and the blue light B, respectively. In some embodiments, the wavelength band of the red light R projected by the light sources 910a is about 633 nm, but the disclosure is not limited in this regard. In some embodiments, the wavelength band of the green light G projected by the light sources 910b is about 532 nm, but the disclosure is not limited in this regard. In some embodiments, the wavelength band of the blue light B projected by the light sources 910c is about 457 nm, but the disclosure is not limited in this regard. In some embodiments, the light sources 910a, 910b, 910c may be laser diodes, but the disclosure is not limited in this regard.

As shown in FIG. 3, the optical exposure system 900 further includes four mirrors 920a, 920b, 920c, 920d, two half-wave plates 930a, 930b, a polarizing beam splitter 940, two spatial filters 950a, 950b, two lenses 960a, 960b, and a prism 970. A photopolymer is attached to a side of the prism 970. The optical exposure system 900 is configured to expose a portion of the photopolymer P with two light beams (e.g., a reference beam and a signal beam) in difference incidence directions from opposite sides of the photopolymer P. The photopolymer P includes monomer, polymer, photo-initiator, and binder. When the photopolymer P is subjected to an exposure process, the photo-initiator receives photons to generate radicals, so that the monomers begin to polymerize (i.e., photopolymerization). By using the exposure method of hologram interference fringe, the monomer that is not illuminated by the light (i.e., in dark zone) is diffused to the light recording zone (i.e., bright zone) and polymerized, thereby causing a non-uniform concentration gradient of the polymer. And finally, after fixing, phase gratings (i.e., the first holographic grating 1211a, the second holographic grating 1211b, and the third holographic grating 1211c) each including bright and dark stripes arranged in a staggered manner can be formed, and the photopolymer P is transformed to the holographic element 121a.

In some embodiments, a volume holographic grating can form a transmissive holographic grating or a reflective holographic grating according to different fabrication methods. Specifically, as shown in FIG. 3, by exposing the photopolymer P with two light beams in difference incidence directions from opposite sides of the photopolymer P, the holographic element 121*a* can be fabricated as a reflective holographic element (i.e., the first holographic grating 1211*a*, the second holographic grating 1211*b*, and the third holographic grating 1211*c* are reflective holographic gratings). In some embodiments, by exposing the photopolymer P with the light beams in difference incidence directions from the same side of the photopolymer P (the optical path of the optical exposure system 900 as shown in FIG. 3 needs to be modified), the holographic element 121*a* can be fabricated as a transmissive holographic element (i.e., the first holographic grating 1211*a*, the second holographic grating 1211*b*, and the third holographic grating 1211*c* are transmissive holographic gratings).

In some embodiments, the holographic element 121*b* can also be fabricated as a transmissive holographic element or a reflective holographic element. For example, as shown in FIG. 1, the holographic elements 121*a*, 121*b* are both reflective holographic elements and at opposite sides of the waveguide element 122 respectively. Specifically, the holographic elements 121*a*, 121*b* are respectively attached to a first surface 122*a* and a second surface 122*b* of the waveguide element 122.

Figure 4:
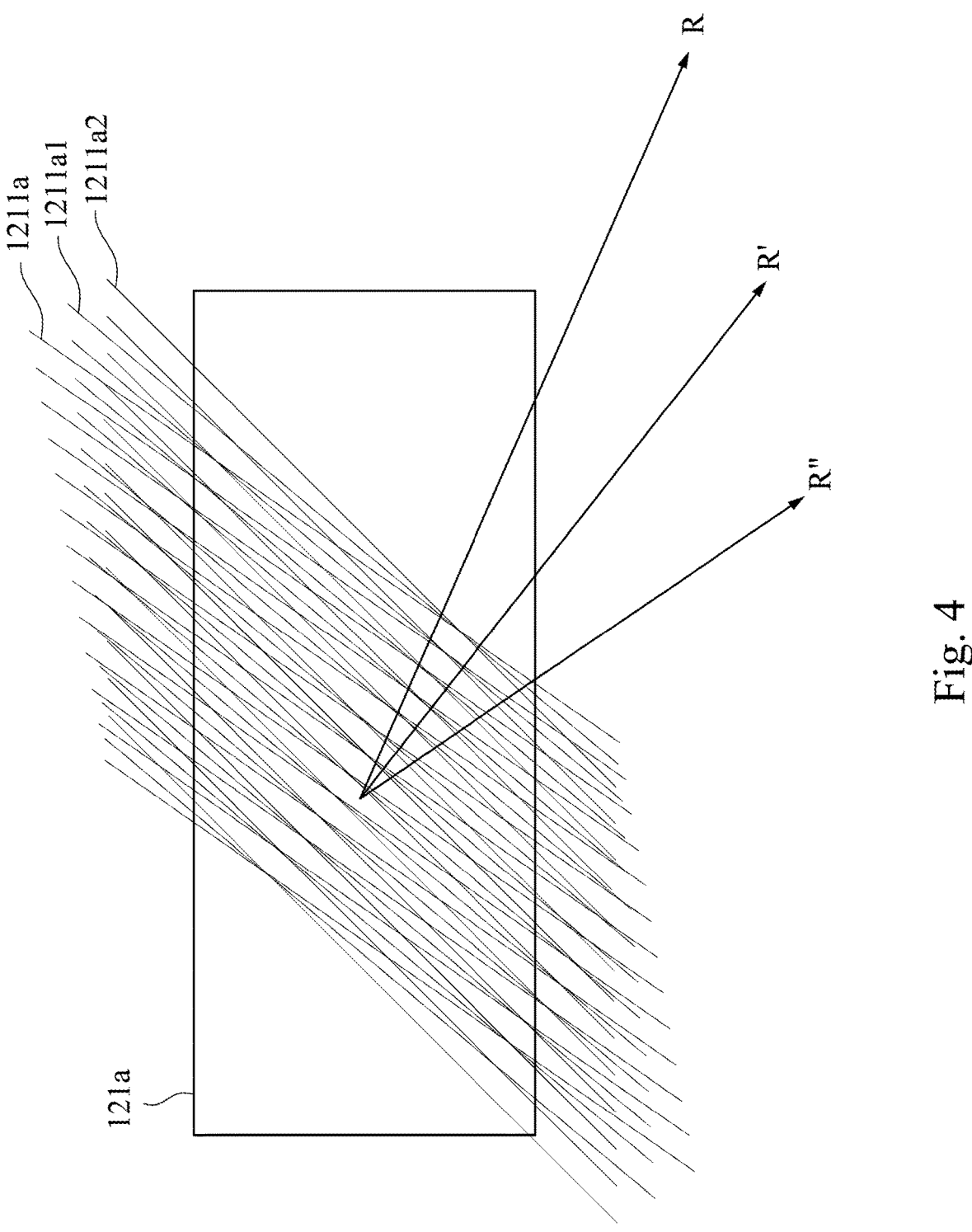
FIG. 4 is a schematic diagram illustrating a holographic element according to some embodiments of the present disclosure.

Reference is made to FIG. 4. FIG. 4 is a schematic diagram illustrating the holographic element 121*a* according to some embodiments of the present disclosure. For example, FIG. 4 shows the surface of the holographic element 121*a* attached to the waveguide element 122 as shown in FIG. 1, and the viewing angle of FIG. 4 is perpendicular to the surface of the holographic element 121*a*. As shown in FIG. 4, in addition to the first holographic grating 1211*a*, the holographic element 121*a* further has a fourth holographic grating 1211*a*1 and a fifth holographic grating 1211*a*2. The fourth holographic grating 1211*a*1 is configured to diffract the red light R to propagate with a fourth range of diffraction angle. For example, the fourth holographic grating 1211*a*1 is configured to diffract light of which the wavelength is 632 nm to propagate with a fourth diffraction angle which is equal to the first diffraction angle Da plus 5 degrees (as indicated by light R' shown in FIG. 4). The fifth holographic grating 1211*a*2 is configured to diffract the red light R to propagate with a fifth range of diffraction angle. For example, the fifth holographic grating 1211*a*2 is configured to diffract light of which the wavelength is 632 nm to propagate with a fifth diffraction angle which is equal to the first diffraction angle Da plus 10 degrees (as indicated by light R" shown in FIG. 4).

Reference is made to FIG. 5. FIG. 5 is a flow chart of a method of manufacturing an optical element according to some embodiments of the present disclosure. As shown in FIG. 5, the method of manufacturing an optical element mainly includes steps S101, S102, S103, S104, and S105.

Step S101: multiplying a non-uniform light intensity distribution function by a diffraction intensity and angle function of at least one grating to obtain a product function.

Figure 6:
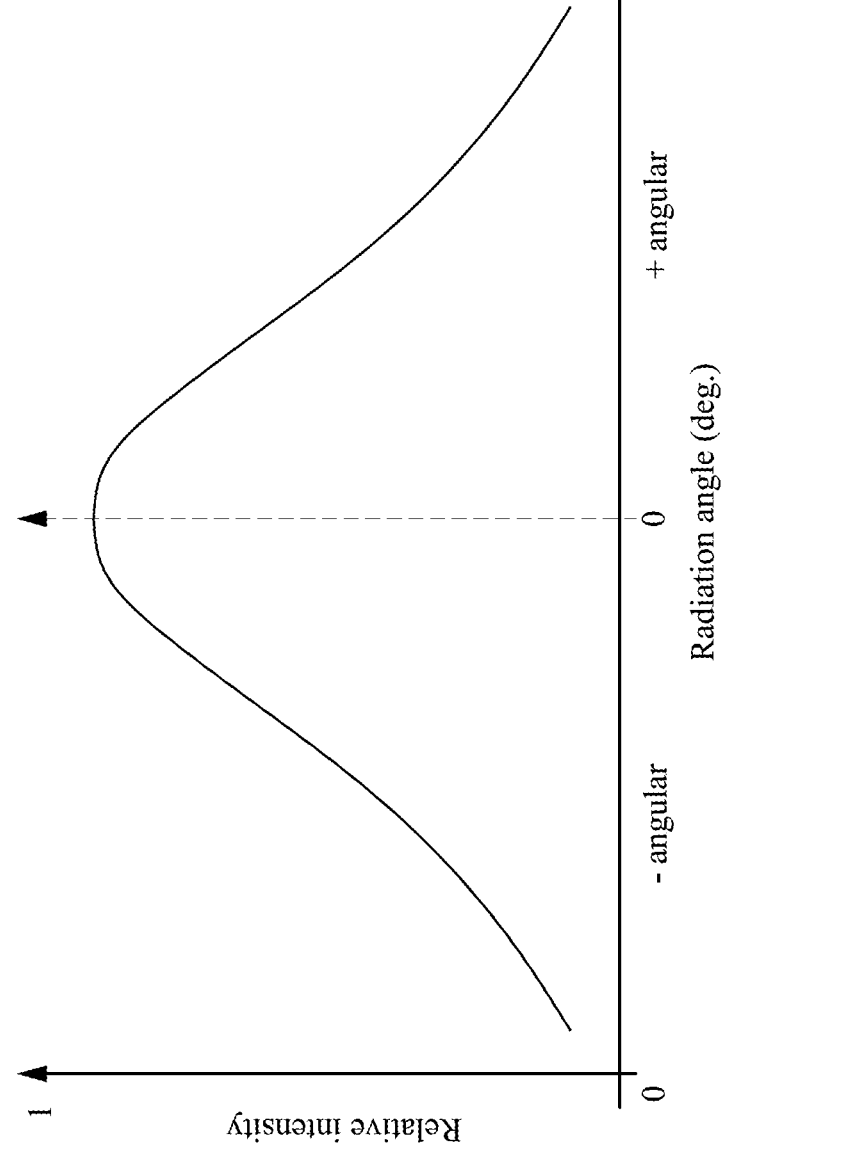
FIG. 6 is an energy Gaussian distribution diagram of a light source according to some embodiments of the present disclosure.

Reference is made to FIG. 6. FIG. 6 is an energy Gaussian distribution diagram of the light source 110 according to some embodiments of the present disclosure. As shown in FIG. 6, the Gaussian distribution characteristics of the light source 110 of the projection device 100 have not been uniformly adjusted. Therefore, the light emitted by the light source 110 conforms to the non-uniform light intensity distribution function which can be obtained from FIG. 6.

In some embodiments, the method of manufacturing an optical element may further include: obtaining the diffraction intensity and angle function of the at least one grating according to Kogelnik's coupled-wave theory. In some embodiments, the step of obtaining the diffraction intensity and angle function uses parameters including a total internal reflection angle, a refractive index modulation of the at least one piece of holographic material, a thickness of the at least one piece of holographic material, at least one grating established wavelength, at least one surface period width, and at least one slant angle of grating.

Figure 7:
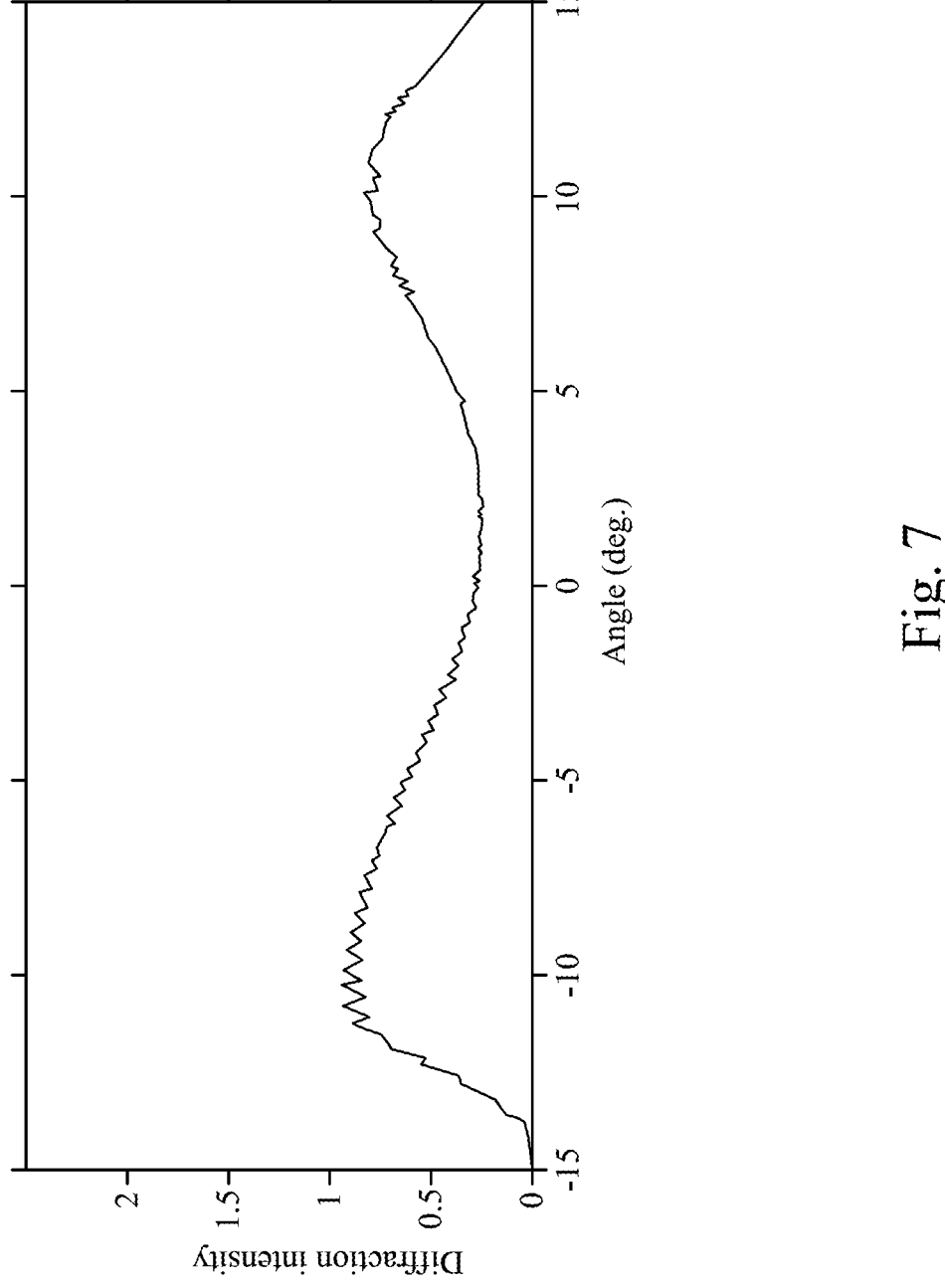
FIG. 7 is a diffraction intensity and angle diagram of a holographic grating according to some embodiments of the present disclosure.

In practical applications, the total internal reflection angle, the refractive index modulation of the at least one piece of holographic material, and the thickness of the at least one piece of holographic material are boundary conditions for the at least one piece of holographic material and can be defined first. Next, the at least one grating established wavelength, the at least one surface period width, and the at least one slant angle of grating can be then given. Finally, the diffraction intensity and angle function can be obtained by using the aforementioned parameters according to Kogelnik's coupled-wave theory. Reference is made to FIG. 7. FIG. 7 is a diffraction intensity and angle diagram of a holographic grating according to some embodiments of the present disclosure. The obtained diffraction intensity and angle function conforms to the diffraction intensity and angle diagram of the holographic grating.

Step S102: determining whether the product function is substantially equal to 1 in a predetermined range of angle or wavelength. If the determination result in step S102 is yes, then step S103 is performed. If the determination result in step S102 is no, then step S105 is performed.

Step S103: determining at least one pair of incident angles respectively of a reference beam and a signal beam according to the diffraction intensity and angle function.

Step S104: recording at least one piece of holographic material with the reference beam and the signal beam respectively at the at least one pair of incident angles, so as to manufacture at least one holographic element with the at least one grating therein. Step S104 can be performed by using the optical exposure system 900 in FIG. 3.

Step S105: adjusting the diffraction intensity and angle function by adjusting at least one of the at least one surface period width and the at least one slant angle of grating.

In some embodiments, method of manufacturing an optical element may further includes: iteratively adjusting the diffraction intensity and angle function to approximate the product function to 1 in the predetermined range of angle or wavelength.

Figure 8:
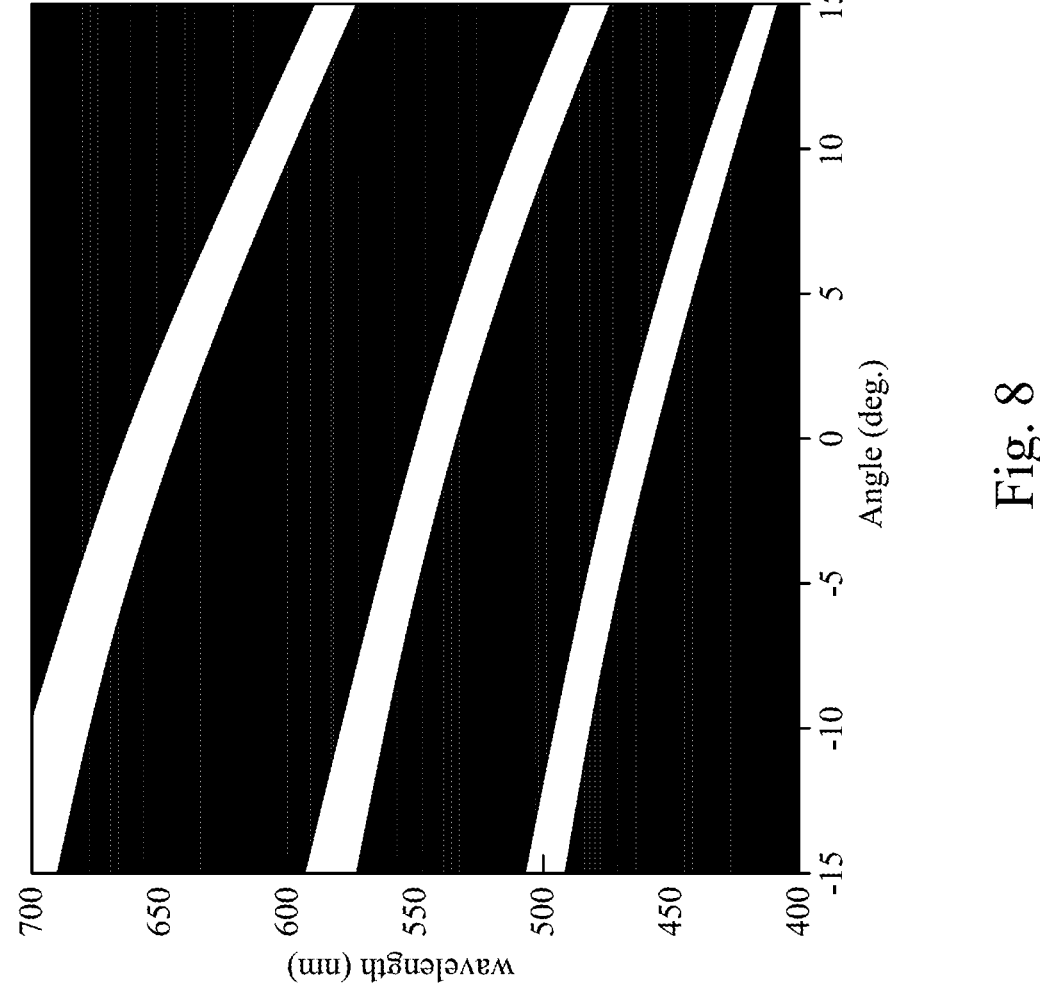
FIG. 8 is a schematic diagram of diffraction intensity versus wavelength and angle of three holographic gratings according to some embodiments of the present disclosure.

Reference is made to FIG. 8. FIG. 8 is a schematic diagram of diffraction intensity versus wavelength and angle of three holographic gratings according to some embodiments of the present disclosure. As shown in FIG. 8, the three holographic gratings correspond to an identical range of angle (i.e., from about −15 degrees to about 15 degrees) and respectively correspond to different ranges of wavelength (i.e., a range from about 575 nm to about 700 nm, a range from about 475 nm to about 600 nm, and a range from about 410 nm to about 505 nm). That is, each of the three holographic gratings can be formed by performing the steps as shown in FIG. 5, and the three holographic gratings respectively compensate the intensity of the light emitted by the light source 110 in different ranges of wavelength.

In practical applications, the number of the holographic gratings may be flexibly changed as needed. That is, the number of the holographic gratings may be greater than or smaller than three.

In some embodiments, the three holographic gratings respectively are the first holographic grating 1211*a*, the second holographic grating 1211*b*, and the third holographic grating 1211c of the holographic element 121a or the holographic element 121b. That is, only one of the holographic element 121a and the holographic element 121b is used to compensate the light source 110.

Figure 9:
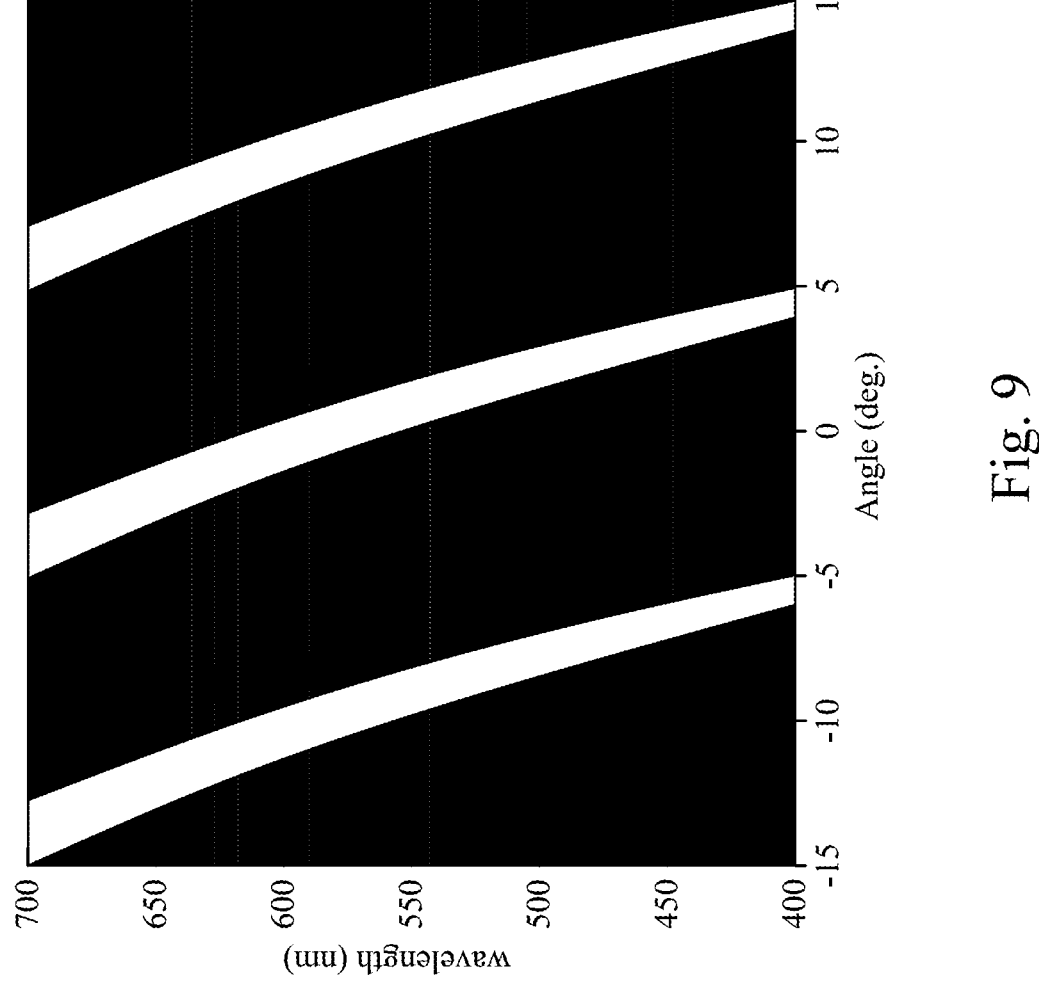
FIG. 9 is a schematic diagram of diffraction intensity versus wavelength and angle of three holographic gratings according to some embodiments of the present disclosure.

Reference is made to FIG. 9. FIG. 9 is a schematic diagram of diffraction intensity versus wavelength and angle of three holographic gratings according to some embodiments of the present disclosure. As shown in FIG. 9, the three holographic gratings correspond to an identical range of wavelength (i.e., from about 400 nm to about 700 nm) and respectively correspond to different ranges of angle (i.e., a range from about −15 degrees to about −5 degrees, a range from about −5 degrees to about 5 degrees, and a range from about 5 degrees to about 15 degrees). That is, each of the three holographic gratings can be formed by performing the steps as shown in FIG. 5, and the three holographic gratings respectively compensate the intensity of the light emitted by the light source 110 in different ranges of angle.

Figure 10:
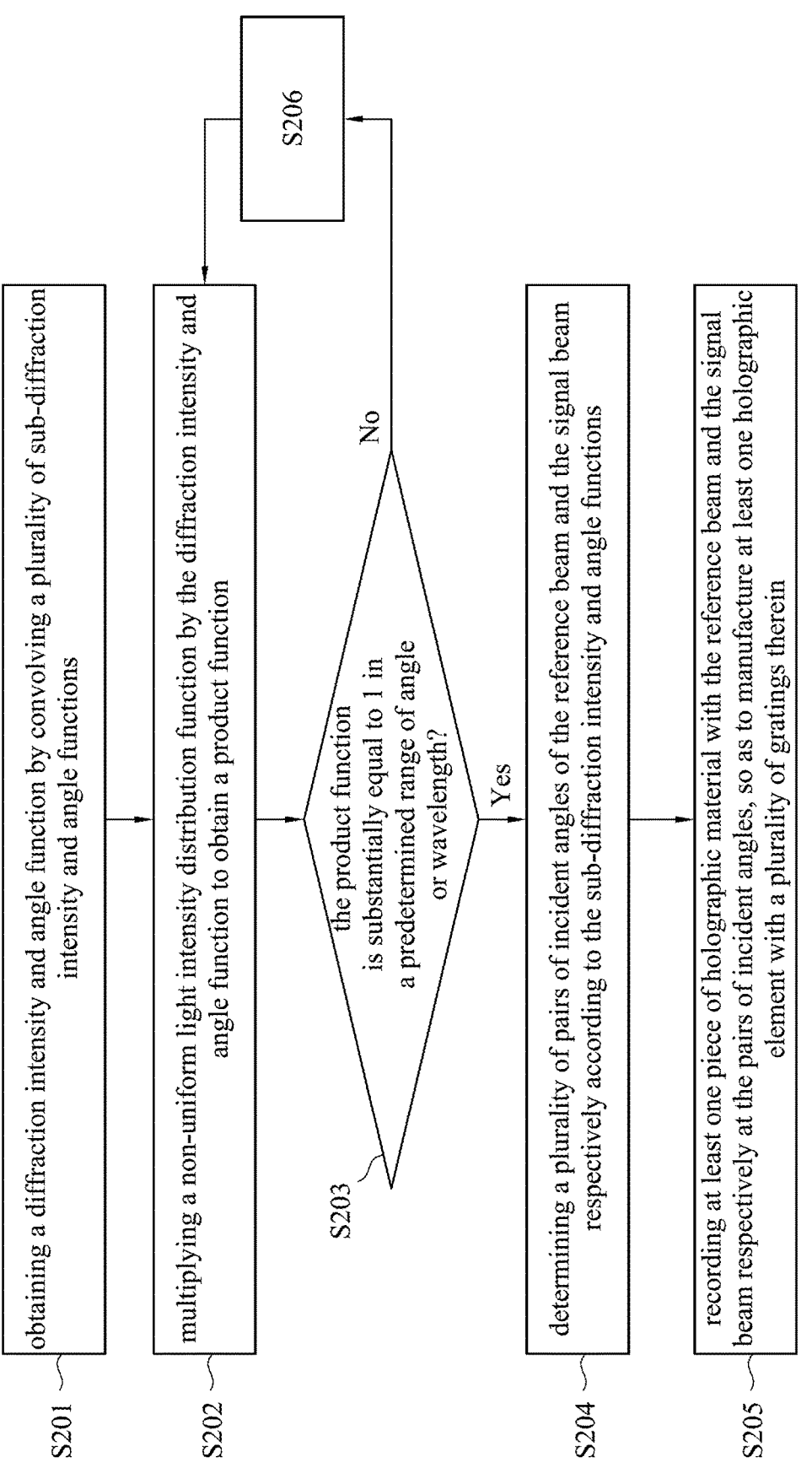
FIG. 10 is a flow chart of a method of manufacturing an optical element according to some embodiments of the present disclosure.

Reference is made to FIG. 10. FIG. 10 is a flow chart of a method of manufacturing an optical element according to some embodiments of the present disclosure. As shown in FIG. 10, the method of manufacturing an optical element mainly includes steps S201, S202, S203, S204, S205, and S206.

Step S201: obtaining a diffraction intensity and angle function by convolving a plurality of sub-diffraction intensity and angle functions. In other words, the diffraction intensity and angle function is the convolution of the sub-diffraction intensity and angle functions.

In some embodiments, a plurality of gratings respectively conform to the sub-diffraction intensity and angle functions. In some embodiments, the method of manufacturing an optical element may further include: obtaining the sub-diffraction intensity and angle functions according to Kogelnik's coupled-wave theory. In some embodiments, the step of obtaining the sub-diffraction intensity and angle functions uses parameters including a total internal reflection angle, a refractive index modulation of the at least one piece of holographic material, a thickness of the at least one piece of holographic material, a plurality of grating established wavelengths respectively of the gratings, a plurality of surface period widths respectively of the gratings, and a plurality of slant angles respectively of the gratings. In other words, each of the sub-diffraction intensity and angle functions may be obtained by the same approach as the diffraction intensity and angle function in FIG. 5.

Step S202: multiplying a non-uniform light intensity distribution function by a diffraction intensity and angle function to obtain a product function. As mentioned above, the light emitted by the light source 110 conforms to the non-uniform light intensity distribution function which can be obtained from FIG. 6.

Step S203: determining whether the product function is substantially equal to 1 in a predetermined range of angle or wavelength. If the determination result in step S203 is yes, then step S204 is performed. If the determination result in step S203 is no, then step S206 is performed.

Step S204: determining a plurality of pairs of incident angles of the reference beam and the signal beam respectively according to the sub-diffraction intensity and angle functions.

Step S205: recording at least one piece of holographic material with the reference beam and the signal beam respectively at the pairs of incident angles, so as to manufacture at least one holographic element with the plurality of gratings therein. Step S205 can be performed by using the optical exposure system 900 in FIG. 3. As mentioned above, the gratings respectively conform to the sub-diffraction intensity and angle functions.

Step S206: adjusting the diffraction intensity and angle function by convolving the sub-diffraction intensity and angle functions with another sub-diffraction intensity and angle function.

In some embodiments, a total number of the sub-diffraction intensity and angle functions may be two, but the present disclosure is not limited in this regard. In practical applications, the total number of the sub-diffraction intensity and angle functions can be flexibly changed as needed.

In some embodiments, the total number of the sub-diffraction intensity and angle functions are two, and the corresponding two grating are respectively formed in two holographic elements. For example, the first holographic gratings 1211a of the holographic elements 121a, 121b may respectively conform to the sub-diffraction intensity and angle functions. Alternatively, the second holographic gratings 1211b of the holographic elements 121a, 121b may respectively conform to the sub-diffraction intensity and angle functions. Alternatively, the third holographic gratings 1211c of the holographic elements 121a, 121b may respectively conform to the sub-diffraction intensity and angle functions.

Figure 11:
FIG. 11 is a schematic diagram of a projection device according to some embodiments of the present disclosure.

Reference is made to FIG. 11. FIG. 11 is a schematic diagram of a projection device 200 according to some embodiments of the present disclosure. As shown in FIG. 11, the projection device 200 includes a light source 110, a holographic element 221, and an optical combiner 222. The projection device 200 may be an AR device, but the present disclosure is not limited in this regard. The holographic element 221 is attached on a side of the optical combiner 222. The light source 110 is disposed at the side of the optical combiner 222 and emits light to the holographic element 221. The holographic element 221 is a reflective holographic element and configured to reflect the light emitted by the light source 110 to an eye of a user. In some embodiments, the holographic element 221 may include at least one reflective holographic grating formed by performing the method of FIG. 5 or the method of FIG. 10. The at least one reflective holographic grating can compensate the intensity of the light emitted by the light source 110.

According to the foregoing recitations of the embodiments of the disclosure, it can be seen that in the method of manufacturing an optical element used in a projection device, the at least one grating formed in the at least one holographic element can compensate the light emitted by the light source which conforms to the uniform light intensity distribution function, so that the compensated light can conform to the non-uniform light intensity distribution function and thus a uniform image can be obtained. In this way, there is no need to add components for uniform light in the projection device, and the number of multiplexing of the holographic gratings can be reduced to make the projection device more efficient and lighter.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of manufacturing an optical element used in a projection device, the projection device having a light source configured to emit light conforming to a non-uniform light intensity distribution function, the method comprising:

multiplying the non-uniform light intensity distribution function by a diffraction intensity and angle function of at least one first grating to obtain a product function;

determining whether the product function is substantially equal to 1 in a predetermined range of angle or wavelength such that the light, when compensated by the at least one first grating, conforms to a uniform light intensity distribution function;

if the product function is not substantially equal to 1 in the predetermined range of angle or wavelength, adjusting the diffraction intensity and angle function by adjusting at least one of at least one surface period width and at least one slant angle of the at least one first grating;

if the product function is substantially equal to 1 in the predetermined range of angle or wavelength, determining at least one pair of incident angles respectively of a reference beam and a signal beam according to the diffraction intensity and angle function; and recording at least one piece of holographic material with the reference beam and the signal beam respectively at the at least one pair of incident angles, so as to manufacture at least one holographic element with the at least one first grating therein.

2. The method of claim 1, further comprising:

obtaining the diffraction intensity and angle function of the at least one first grating according to Kogelnik's coupled-wave theory.

3. The method of claim 2, wherein the obtaining the diffraction intensity and angle function uses parameters comprising a total internal reflection angle, a refractive index modulation of the at least one piece of holographic material, a thickness of the at least one piece of holographic material, at least one grating established wavelength, at least one surface period width, and at least one slant angle of the at least one first grating.

4. The method of claim 1, further comprising:

iteratively adjusting the diffraction intensity and angle function to approximate the product function to 1 in the predetermined range of angle or wavelength.

5. The method of claim 1, further comprising:

multiplying the non-uniform light intensity distribution function by another diffraction intensity and angle function of a second grating to obtain another product function;

determining whether the another product function is substantially equal to 1 in another predetermined range of angle or wavelength;

if the another product function is substantially equal to 1 in the another predetermined range of angle or wavelength, determining another pair of incident angles of the reference beam and the signal beam according to the another diffraction intensity and angle function; and recording the at least one piece of holographic material with the reference beam and the signal beam respectively at the another pair of incident angles, so as to form the second grating in the at least one holographic element.

6. The method of claim 5, wherein the at least one first grating and the second grating are configured to diffract light within an identical range of angle and are configured to respectively diffract light within different ranges of wavelength.

7. The method of claim 5, wherein the at least one first grating and the second grating are configured to diffract light within an identical range of wavelength and are configured to respectively diffract light within different ranges of angle.

8. The method of claim 1, further comprising:

obtaining the diffraction intensity and angle function by convolving a plurality of sub-diffraction intensity and angle functions.

9. The method of claim 8, wherein a number of the at least one first grating is plural, the first gratings respectively conform to the sub-diffraction intensity and angle functions, a pair number of the at least one pair of incident angles is plural, each of the pairs of incident angles respectively corresponds to the sub-diffraction intensity and angle functions, and the recording comprises recording the at least one piece of holographic material with the reference beam and the signal beam respectively at each of the pairs of incident angles.

10. The method of claim 8, further comprising:

if the product function is not substantially equal to 1 in the predetermined range of angle or wavelength, adjusting the diffraction intensity and angle function by convolving the sub-diffraction intensity and angle functions with another sub-diffraction intensity and angle function;

determining whether the adjusted product function is substantially equal to 1 in the predetermined range of angle or wavelength;

if the adjusted product function is substantially equal to 1 in the predetermined range of angle or wavelength, determining a plurality of pairs of incident angles of the reference beam and the signal beam respectively according to the sub-diffraction intensity and angle functions and the another sub-diffraction intensity and angle function; and recording the at least one piece of holographic material with the reference beam and the signal beam respectively at each of the pairs of incident angles, wherein a number of the at least one first grating is plural, and the first gratings respectively correspond to the sub-diffraction intensity and angle functions and the another sub-diffraction intensity and angle function.

11. The method of claim 1, wherein a number of the at least one piece of holographic material, a number of the at least one holographic element, and a number of the at least one first grating are plural, and the recording respectively forms two of the first gratings in two of the holographic elements.

* * * * *